United States Patent
Golovchinsky et al.

(10) Patent No.: US 7,644,073 B2
(45) Date of Patent: Jan. 5, 2010

(54) SYSTEM AND METHOD FOR COLLABORATIVE LESSON PLANNING

(75) Inventors: Gene Golovchinsky, Menlo Park, CA (US); Anthony Dunnigan, Berkeley, CA (US); Helen Hwang, Sunnyvale, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 256 days.

(21) Appl. No.: 11/741,698

(22) Filed: Apr. 27, 2007

(65) Prior Publication Data

US 2008/0270357 A1 Oct. 30, 2008

(51) Int. Cl.
*G06F 17/30* (2006.01)
(52) U.S. Cl. .......................................... 707/4
(58) Field of Classification Search ............... 707/3–5, 707/102, 104.1, 100, 200; 434/350
See application file for complete search history.

(56) References Cited

U.S. PATENT DOCUMENTS 6,149,441 A * 11/2000 Pellegrino et al. ........... 434/350
2008/0070220 A1 * 3/2008 McAvoy et al. ............. 434/322
2008/0162323 A1 * 7/2008 Menear et al. ............... 705/35
2009/0083062 A1 * 3/2009 Gupta ........................... 705/1

OTHER PUBLICATIONS

Adam L. Berger, et al., "A Maximum Entropy Approach to Natural Language Processing," *Computational. Linguistics*, Mar. 1996, pp. 39-71. vol. 22, No. 1.
Daniel Billsus, et al., "Improving Proactive Information Systems," In Proceedings of the *International Conference on Intelligent User Interfaces*, IUI 2005, Jan. 9-12, 2005, San Diego, CA U.S.A.
Richard M. Ingersoll, et al., "The Wrong Solution to the Teacher Shortage," *Educational Leadership*, May 2003, pp. 30-33, vol. 60, No. 8.

* cited by examiner

*Primary Examiner*—Cheryl Lewis
(74) *Attorney, Agent, or Firm*—Sughrue Mion, PLLC

(57) ABSTRACT

The system enables novice teachers to leverage the expertise of other more experienced teachers who are distributed across geographical areas covered by similar teaching standards (usually states). By leveraging the vast body of knowledge contained within their peer group, the system is designed to help teachers produce better lesson plans. This is accomplished by providing teachers with suggestions based other teachers' plans for similar lessons.

30 Claims, 4 Drawing Sheets

SYSTEM AND METHOD FOR COLLABORATIVE LESSON PLANNING

DESCRIPTION OF THE INVENTION

1. Field of the Invention

The present invention generally relates to teaching aids, and, more specifically, to techniques for collaborative lesson planning.

2. Description of the Related Art

It is well known that teacher attrition harms the education system. It is estimated that after five years, 40% to 50% of K-12 teachers have left the profession. Many new teachers cite lack of planning time as one of the reasons for leaving the teaching profession. Teachers, especially novice teachers, benefit from collaboration with others while designing lesson plans. However, conventionally, this collaboration is rare due to the schedules kept by most teachers and the resources available to them.

Existing systems primarily take from of standalone desktop software products. These products do not offer key service features such as collaboration, recommendations, and reuse. The online lesson plan directories provide some guidance to the teachers, however they currently have limited content and lack most of the key features mentioned above.

Thus, novice teachers need a new system that would help them in creating lesson plans that meet appropriate state standards and leverage the knowledge and experience of other teachers.

SUMMARY OF THE INVENTION

The inventive methodology is directed to methods and systems that substantially obviate one or more of the above and other problems associated with conventional techniques for collaborative lesson planning.

In accordance with an aspect of the inventive technique, there is provided a computerized lesson planning system. The inventive system incorporates a user interface configured to receive a new lesson plan information associated with a new lesson plan from a user, a storage device configured to store the received new lesson plan information; and a suggestion generation module configured to generate a suggestion for the user. The generated suggestion is based on existing lesson plans input by other users and stored in the storage device. The suggestion generation module is further configured to perform searching of the existing lesson plans that are similar, at least in part, to the new lesson plan.

In accordance with another aspect of the inventive technique, there is provided a method and an associated computer programming product embodying computer-readable code implementing said method. Specifically, the inventive method involves: receiving a new lesson plan information associated with a new lesson plan from a user; storing the received new lesson plan information; and generating a suggestion for the user. The generated suggestion is based on existing lesson plans input by other users and stored in the storage device. The generating involves searching of the existing lesson plans that are similar, at least in part, to the new lesson plan.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

An embodiment of the inventive system generates suggestions for improving lesson plans based on previously-recorded lesson plans. Novice teachers may need help to create lesson plans that meet appropriate state standards; the inventive approach reduces the time and effort required to do so. The suggestions are generated by the inventive system by comparing a new lesson plan to aggregates of similar plans created by other teachers. In accordance with an embodiment of the invention, the presented suggestions may be based on the content submitted by any teacher.

In accordance with an embodiment of the invention, a schema for a lesson plan is first defined. The aforesaid schema represents the various components of lessons, their logical relationships, and relationships to state standards. Exemplary elements of a lesson plan include a reference to the standards addressed, if any, the general topic covered, goals of instruction and essential questions, key terms and vocabulary, activities (example problems, questions to be posed to students, guided practice, independent practice, etc.), materials and equipment needed, homework, resources, and the like.

Figure 1:
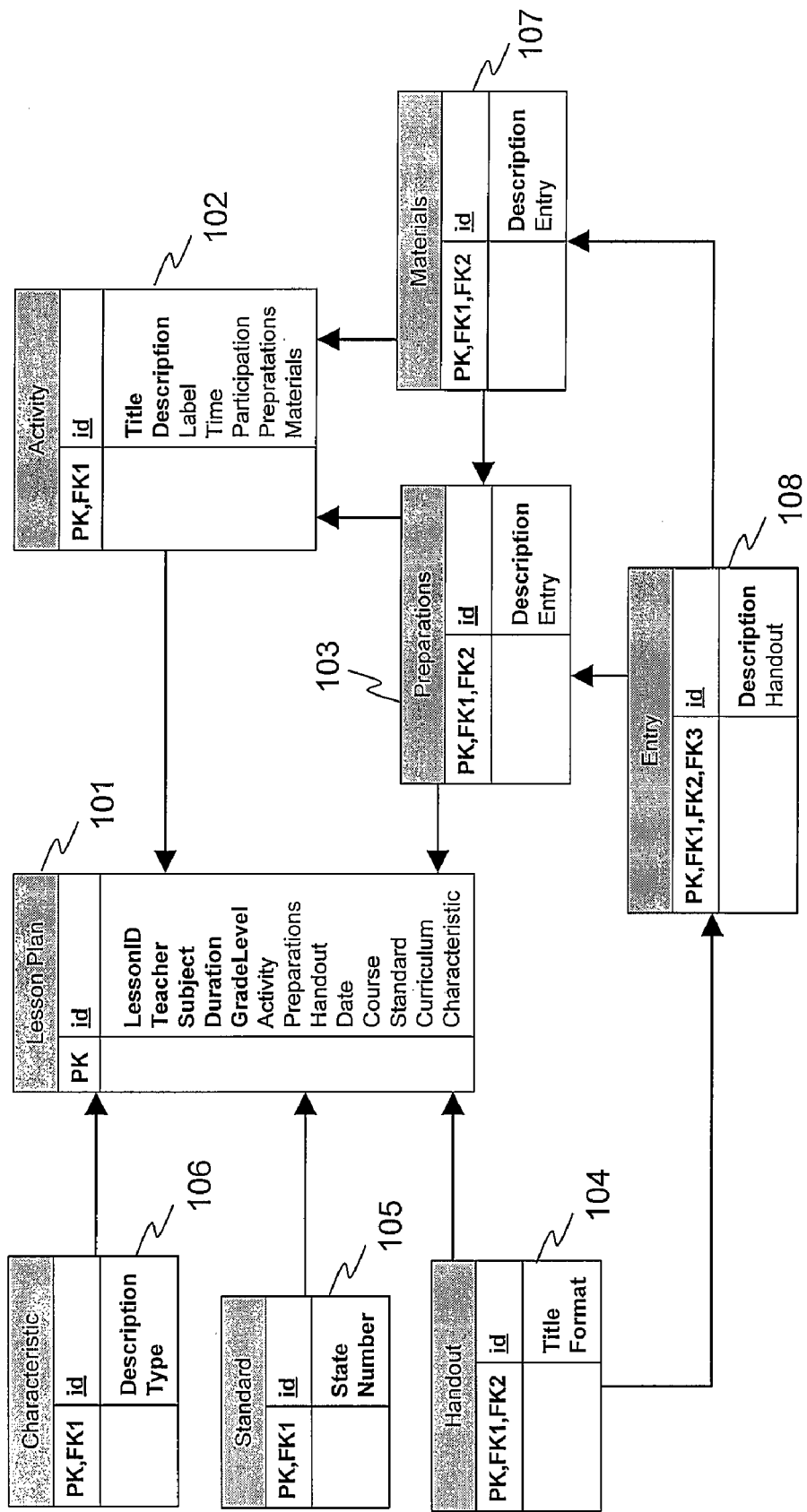
FIG. 1 illustrates an exemplary lesson plan schema.

An exemplary database schema for a lesson plan is illustrated in FIG. 1. Specifically, the schema incorporates eight relational database tables 101-108, having primary key/foreign key constraints. Specifically, eight tables include lesson plan table 101, activity table 102, preparations table 103, handout table 104, standard table 105, characteristic table 106, materials table 107 and entry table 108. The lesson plan table 101 has a lesson plan identifier (id) as a primary key as well as Lesson ID, Teacher, Subject, Duration, and Grade Level columns. In addition, the lesson plan table 101 references rows corresponding to the subject lesson plan in the activity table 102, preparations table 103, handout table 104, standard table 105, characteristic table 106, materials table 107 and entry table 108. The Activity table 102, in turn, incorporates activity title, activity description, activity label, activity time and activity participation columns and references corresponding rows in materials table 107 and preparations table 103. The class handout information is stored in the entry table 108, which includes a description column and references corresponding rows in the handout table 104.

The table 105 stores state teaching standard information and incorporates state and standard number columns. The characteristic table 106 incorporates characteristic description and characteristic type columns. The materials table 107 stores information on various materials that can be used in class by the teacher. This table includes a materials description column and references corresponding rows in the entry table 108. The preparations table 103 incorporates information on preparation materials used by the teacher in preparing for class. This table has a description column and also references corresponding rows in entry table 108 containing information on the materials utilized.

In FIG. 1, the term PK designated a primary key constraint in a relational database table; terms FK1 and FK2 designate foreign key constraints (that is, references to primary keys of other tables). The term "id" is the name of the primary key field in the respective tables. As would be appreciated by those of skill in the art, the above composition of lesson database schema is not limiting in any sense, and any other suitable schemas may be similarly defined.

Teachers using the inventive system are asked to create the specific instance of the lesson plan using a graphical user interface of an embodiment of the inventive system based on the defined schema. In an embodiment of the invention, the aforesaid lesson plan instance may be created for a single lesson or for multiple lessons. The inventive user interface is operable to receive from the participating teachers the specification of various components of the lesson plan, such as the components identified hereinabove as well as other suitable information, in accordance with the defined schema. The information regarding lesson plans received from the teacher(s) is stored in a database or in other suitable data storage structure. In various embodiments of the inventive system, the lesson plans may be stored either centrally, on a central computer or server, or in a distributed manner, for example on the teacher's computer, or otherwise.

Figure 2:
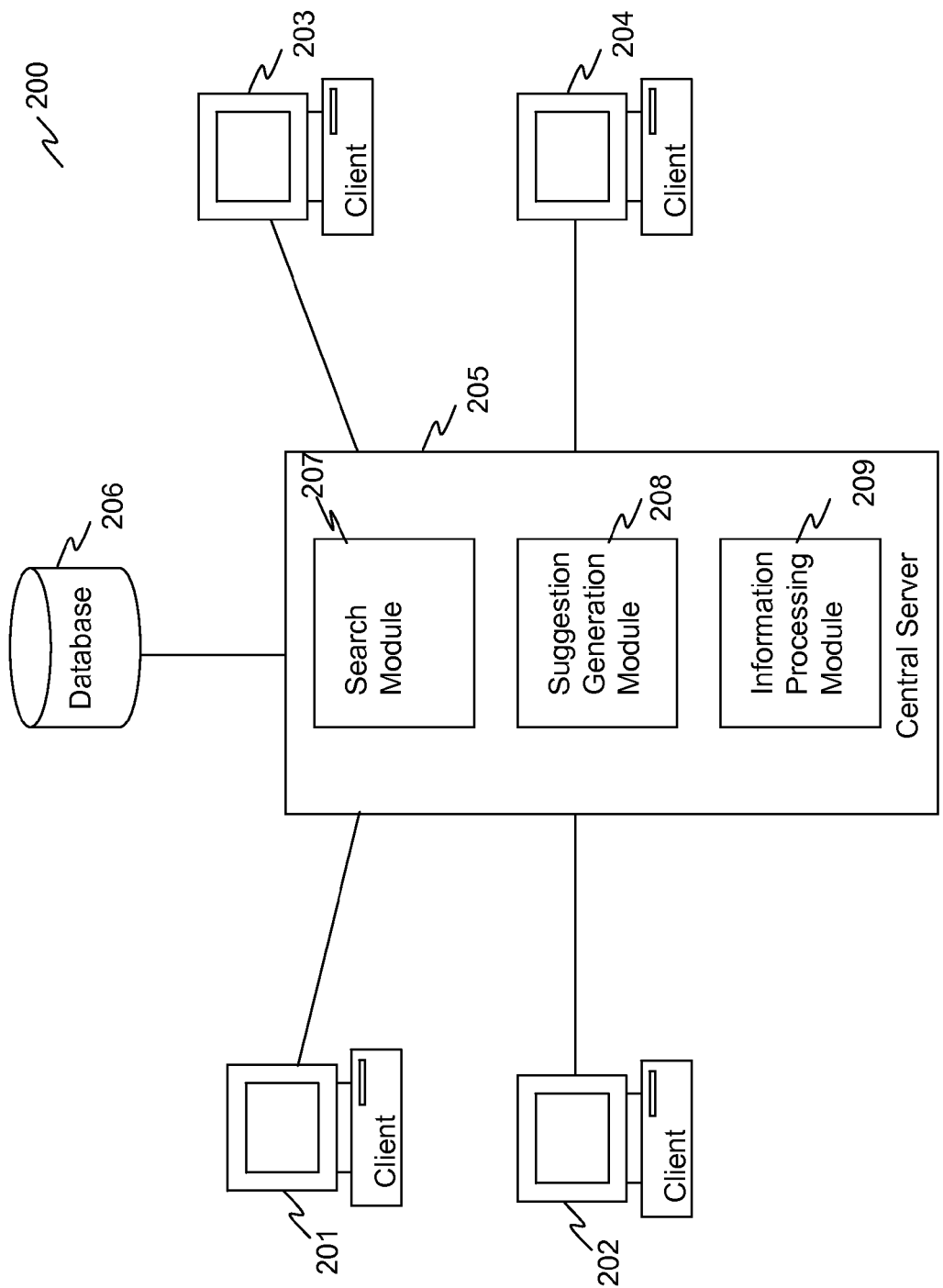
FIG. 2 illustrates an exemplary computerized system in accordance with an embodiment of the inventive concept.

An architecture 200 of an exemplary computerized system in accordance with an embodiment of the inventive concept is shown in FIG. 2. The teachers use client computers 201-204 to enter lesson plan information and view the suggestions generated by the system. The lesson plan information is received, processed and stored by the central server 205. To store the lesson plan information, the server system 205 is provided with a database 206. To perform the aforesaid processing of the lesson plan information, the server 205 incorporates search module 207, suggestion generation module 208 and lesson information processing module 209. It should be also noted that in the shown embodiment, the database 206 additionally stores the aforesaid lesson plan schema.

After the lesson plan information has been input by the participating teacher using one of the clients 201-204, and properly stored in the database 206, an embodiment of the inventive system analyzes related lesson plans input by different teachers. This analysis is performed by the search module 207, and may involve, for example, finding common phrases in the input lesson plane and other lesson plans, that characterize specific aspects of the lesson plan schema. In one embodiment of the invention, the content of each field of the lesson plan schema is clustered based on measures of textual similarity to identify common topics.

After a teacher enters information on a new lesson plan, an embodiment of the inventive system performs searches within each aspect of the lesson plan to identify potential clusters of concepts that could be added to the lesson plan. Specific aspects found in the aggregated plans that are underrepresented in the submitted plan are offered as suggestions. In an embodiment of the invention, clusters that are well represented in the submitted lesson plan may be ranked lower than clusters that contain concepts that are missing from the plan. This approach may be used to expand the range of concepts that the teacher uses to think about and describe each aspect.

Thus, one embodiment of the invention provides to the teacher field-based suggestions (e.g., activities) based on clustering of the information in the corresponding fields of the related lesson plans. However, the present invention is not limited only to field-based suggestions. Another embodiment of the invention provides term-based suggestions (e.g., keywords) based on term salience in the lesson plans.

The suggestion generation module 208 may incorporate a recommender engine similar to PalBar system configured to identify related information. The aforesaid PalBar system is described in Billsus, D., Hilbert, D., and Maynes-Aminzade, D, Improving Proactive Information Systems, In Proceedings of the International Conference on Intelligent User Interfaces (IUI 2005) (Jan. 9, 2005). This approach may be used to suggest alternate or complementary wording for particular items. Alternatively, a maximum-entropy approach well known to persons of ordinary skill in the art, may be used to find concepts that match structurally but are not mentioned in the lesson plan. The aforesaid maximum entropy approach is described, for example, in Berger, A. L., Pietra, V. J., and Pietra, S. A. 1996, A maximum entropy approach to natural language processing, *Comput. Linguist.* 22, 1 (March 1996), 39-71. This may be used to expand key terms and vocabulary associated with the lesson plan. Other techniques based on textual similarity measures may also be applied to find similar passages.

The data unique to the newly specified plan is added to the database of lesson plans maintained by the inventive system. In an embodiment of the invention, the aforesaid database is re-indexed periodically by the lesson plan information processing module 209 to accommodate evolving concept vocabularies. Specifically, when the new lesson plans specified by the teachers include a new concept, not present in the database, the cluster corresponding to the aforesaid new concept is created. Additionally, concepts found in the new lesson plans are added to the appropriate lesson plan concept clusters. In one embodiment of the invention, the system generates suggestions and provides suggestions to other teachers without any explicit action on the part of the teacher.

Figure 3:
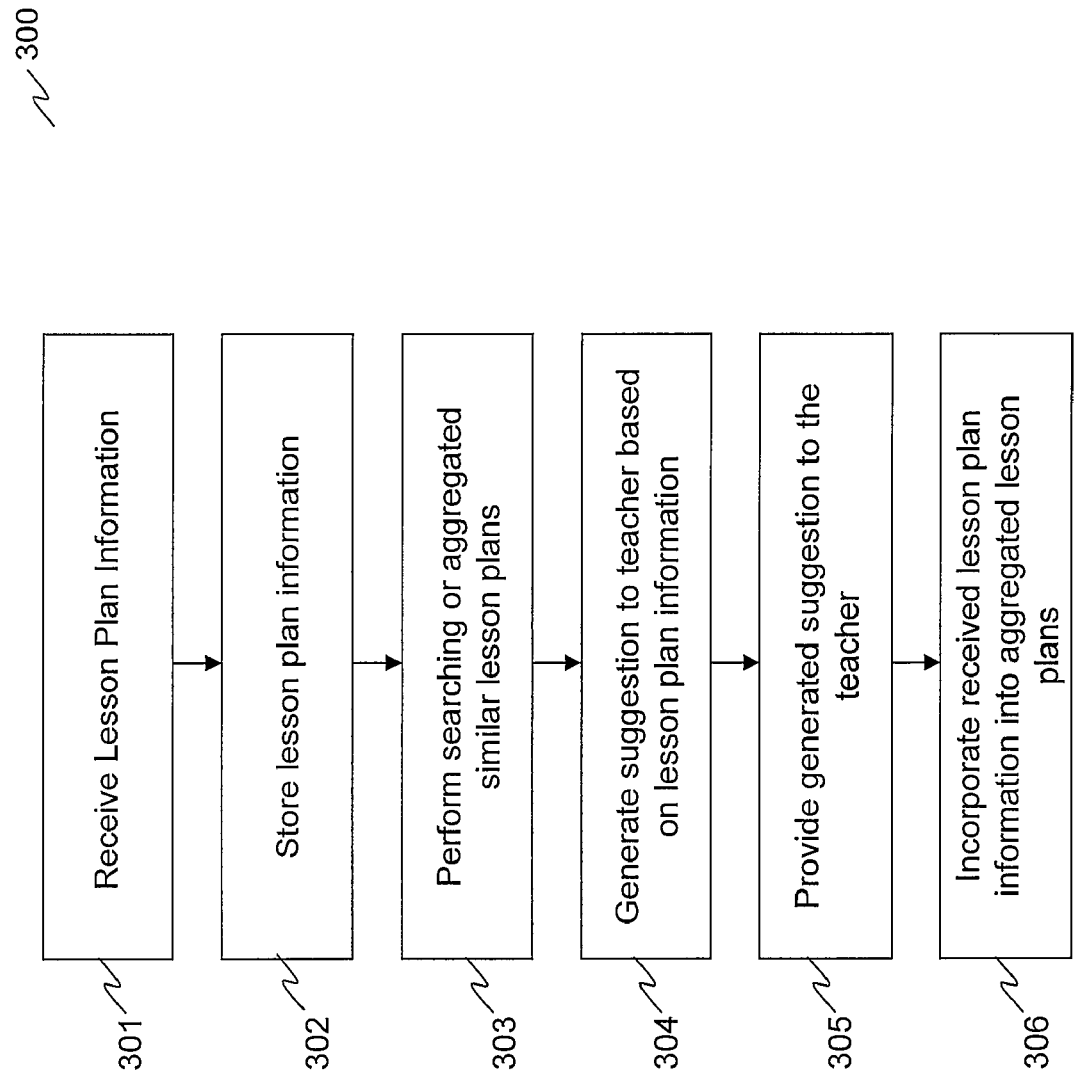
FIG. 3 illustrates exemplary operating sequence of an embodiment of the inventive computerized collaborative lesson planning system.

FIG. 3 illustrates exemplary operating sequence 300 of an embodiment of the inventive computerized collaborative lesson planning system. At step 301, the teacher using the inventive system specifies the lesson plan information in accordance with the lesson plan schema stored in the database 206 or other appropriate storage location. At step 302, the inventive system stores the received lesson plan information in the database 206. At step 303, the system performs searching of the aggregated similar lesson plans stored in the database 206 and generates the appropriate suggestions at step 304. The generated suggestions are provided to the teacher at step 305 via one of the client systems 201-204. Finally, the database 206 storing the aggregated lesson plans is updated at step 306, by incorporating the newly entered lesson plan information into the appropriate lesson plan clusters.

A specific example of the operation of the inventive system and its utilization by a teacher will now be described. For example, a high school history teacher is preparing a lesson plan for a lesson on global conflicts in the 20th century. Initially, she inputs into the inventive system the parameters of the course such as grade level and appropriate state standards, and enters some preliminary ideas about how to describe the factors leading up to the start of WW I, including the naval arms race between the UK and Germany, and rising nationalism. The inventive system compares these factors to those described in other lesson plans related to WW I, and suggests that some lesson plans also mention that alliances among European nations drew many other nations into the conflict. Based on the suggestions generated by the inventive system, the teacher incorporates this information into the lesson plan, and goes on to define exercises for the class to describe the effect that each of the aforesaid factors had on the prolonged nature of the war. Based on the teacher's input, the inventive system additionally suggests that another teacher was successful at getting students to perform role-playing exercises in which different groups represent different nations and empires that participated in the conflict. The teacher also incorporates this suggestion into the lesson plan.

Figure 4:
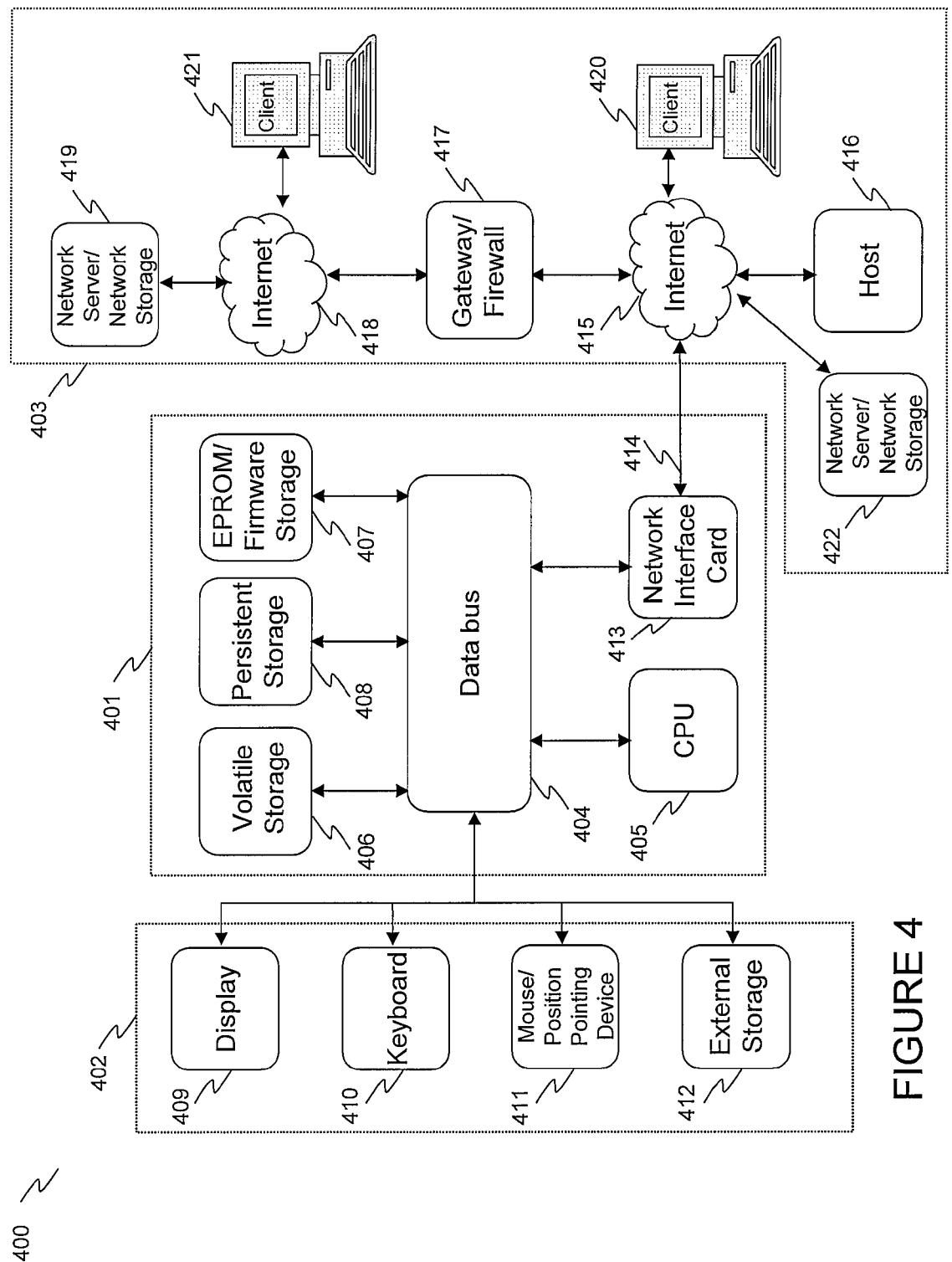
FIG. 4 illustrates an exemplary embodiment of a computer platform upon which the inventive system may be implemented.

FIG. 4 is a block diagram that illustrates an embodiment of a computer/server system 400 upon which an embodiment of the inventive methodology may be implemented. The system 400 includes a computer/server platform 401, peripheral devices 402 and network resources 403.

The computer platform 401 may include a data bus 404 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 404 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 404 for storing static information and instructions for processor 405, such as basic input-output system (BIOS), as well as various system configuration parameters. A persistent storage device 408, such as a magnetic disk, optical disk, or solid-state flash memory device is provided and coupled to bus 401 for storing information and instructions.

Computer platform 401 may be coupled via bus 404 to a display 409, such as a cathode ray tube (CRT), plasma display, or a liquid crystal display (LCD), for displaying information to a system administrator or user of the computer platform 401. An input device 410, including alphanumeric and other keys, is coupled to bus 401 for communicating information and command selections to processor 405. Another type of user input device is cursor control device 411, such as a mouse, a trackball, or cursor direction keys for communicating direction information and command selections to processor 404 and for controlling cursor movement on display 409. This input device typically has two degrees of freedom in two axes, a first axis (e.g., x) and a second axis (e.g., y), that allows the device to specify positions in a plane.

An external storage device 412 may be connected to the computer platform 401 via bus 404 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, the inventive system may reside on a machine such as computer platform 401. According to one embodiment of the invention, the techniques described herein are performed by computer system 400 in response to processor 405 executing one or more sequences of one or more instructions contained in the volatile memory 406. Such instructions may be read into volatile memory 406 from another computer-readable medium, such as persistent storage device 408. Execution of the sequences of instructions contained in the volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 408. Volatile media includes dynamic memory, such as volatile storage 406. Transmission media includes coaxial cables, copper wire and fiber optics, including the wires that comprise data bus 404.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on the data bus 404. The bus 404 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 404. Communication interface 413 provides a two-way data communication coupling to a network link 414 that is connected to a local network 415. For example, communication interface 413 may be an integrated services digital network (ISDN) card or a modem to provide a data communication connection to a corresponding type of telephone line. As another example, communication interface 413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 413 sends and receives electrical, electromagnetic or optical signals that carry digital data streams representing various types of information.

Network link 413 typically provides data communication through one or more networks to other network resources. For example, network link 414 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 414 and through communication interface 413, which carry the digital data to and from computer platform 401, are exemplary forms of carrier waves transporting the information.

Computer platform 401 can send messages and receive data, including program code, through the variety of network (s) including Internet 418 and LAN 415, network link 414 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution. In this manner, computer system 401 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in a computerized system for collaborative lesson planning. It is intended that the specification and examples be considered as exemplary only, with a true scope and spirit of the invention being indicated by the following claims.

What is claimed is:

1. A computerized lesson planning system comprising:
   a. a user interface operable to receive a new lesson plan information associated with a new lesson plan from a user;
   b. a storage device operable to store the received new lesson plan information; and
   c. a suggestion generation module operable to generate a suggestion for the user, based, at least in part, on existing lesson plans input by other users and stored in the storage device, wherein the suggestion generation module is operable to perform searching of the existing lesson plans that are similar, at least in part, to the new lesson plan;
   d. a lesson plan information processing module operable to update the storage device based on the new lesson plan information wherein the updating of the storage device comprises determining whether the new lesson plan information includes a new concept and, if so, adding the new concept to an existing concept list.

2. The computerized lesson planning system of claim 1, wherein the user interface is additionally operable to provide the generated suggestion to the user.

3. The computerized lesson planning system of claim 1, wherein the suggestion generation module is operable to perform searching of the existing lesson plan information based on the clustering of the existing lesson plans.

4. The computerized lesson planning system of claim 3, wherein the existing lesson plans are clustered based on common phrases in the existing lesson plans.

5. The computerized lesson planning system of claim 1, wherein the generated suggestion comprises a potential concept that could be added to the new lesson plan.

6. The computerized lesson planning system of claim 1, wherein the generated suggestion comprises an alternate or complementary wording of at least a portion of the new lesson plan.

7. The computerized lesson planning system of claim 1, wherein the suggestion generation module is operable to perform searching of existing lesson plans based on a maximum-entropy calculation.

8. The computerized lesson planning system of claim 1, wherein the suggestion generation module is operable to determine similarity between the existing lesson plans and the new lesson plan based on geographical locations of corresponding users.

9. The computerized lesson planning system of claim 1, wherein the suggestion generation is operable to determine similarity between the existing lesson plans and the new lesson plan based on the applicable teaching standard.

10. The computerized lesson planning system of claim 1, wherein the suggestion generation module is further operable to generate the suggestion for the user additionally based on an applicable teaching standard.

11. A method comprising:
   a. receiving a new lesson plan information associated with a new lesson plan from a user;
   b. storing the received new lesson plan information; and
   c. generating a suggestion for the user, based, at least in part, on existing lesson plans input by other users and stored in the storage device, wherein the generating comprises searching of the existing lesson plans that are similar, at least in part, to the new lesson plan;
   d. updating the storage device based on the new lesson plan information, wherein the updating of the storage device comprises determining whether the new lesson plan information includes a new concept and, if so, adding the new concept to an existing concept list.

12. The method of claim 11, further comprising providing the generated suggestion to the user.

13. The method of claim 11, further comprising searching of the existing lesson plan information based on the clustering of the existing lesson plans.

14. The method of claim 13, wherein the existing lesson plans are clustered based on common phrases in the existing lesson plans.

15. The method of claim 11, wherein the generated suggestion comprises a potential concept that could be added to the new lesson plan.

16. The method of claim 11, wherein the generated suggestion comprises an alternate or complementary wording of at least a portion of the new lesson plan.

17. The method of claim 11, further comprising searching of existing lesson plans based on a maximum-entropy calculation.

18. The method of claim 11, wherein similarity between the existing lesson plans and the new lesson plan is determined based on geographical locations of corresponding users.

19. The method of claim 11, wherein similarity between the existing lesson plans and the new lesson plan is determined based on the applicable teaching standard.

20. The method of claim 11, wherein the generated suggestion is further based on an applicable teaching standard.

21. A computer readable storage medium embodying a set of instructions, which, when executed by one or more processors, cause the one or more processors to:
   a. receive a new lesson plan information associated with a new lesson plan from a user;
   b. store the received new lesson plan information; and
   c. generate a suggestion to the user, based, at least in part, on existing lesson plans input by other users and stored in the storage device, wherein the generating comprises searching the existing lesson plans that are similar, at least in part, to the new lesson plan;
   d. updating the storage device based on the new lesson plan information, wherein the updating of the storage device comprises determining whether the new lesson plan information includes a new concept and, if so, adding the new concept to an existing concept list.

22. The computer readable storage medium of claim 21, further comprising instructions for providing the generated suggestion to the user.

23. The computer readable storage medium of claim 21, further comprising instructions for searching of the existing lesson plan information based on the clustering of the existing lesson plans.

24. The computer readable storage medium of claim 23, wherein the existing lesson plans are clustered based on common phrases in the existing lesson plans.

25. The computer readable storage medium of claim 21, wherein the generated suggestion comprises a potential concept that could be added to the new lesson plan.

26. The computer readable storage medium of claim 21, wherein the generated suggestion comprises an alternate or complementary wording of at least a portion of the new lesson plan.

27. The computer readable storage medium of claim 21, further comprising instructions for searching of existing lesson plans based on a maximum-entropy calculation.

28. The computer readable storage medium of claim 21, wherein similarity between the existing lesson plans and the new lesson plan is determined based on geographical locations of corresponding users.

29. The computer readable storage medium of claim 21, wherein similarity between the existing lesson plans and the new lesson plan is determined based on the applicable teaching standard.

30. The computer readable storage medium of claim 21, wherein the generated suggestion is further based on an applicable teaching standard.

* * * * *